US012568508B2

(12) United States Patent
Xu et al.

(10) Patent No.: US 12,568,508 B2
(45) Date of Patent: Mar. 3, 2026

(54) MULTIPLE DCIS TRANSMITTED OVER PDSCH

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 571 days.

(21) Appl. No.: 17/913,138

(22) PCT Filed: Apr. 8, 2020

(86) PCT No.: PCT/CN2020/083666
§ 371 (c)(1),
(2) Date: Sep. 20, 2022

(87) PCT Pub. No.: WO2021/203268
PCT Pub. Date: Oct. 14, 2021

(65) Prior Publication Data
US 2023/0156739 A1 May 18, 2023

(51) Int. Cl.
*H04W 72/232* (2023.01)

(52) U.S. Cl.
CPC ................................ *H04W 72/232* (2023.01)

(58) Field of Classification Search
CPC .. H04W 72/232; H04W 72/23; H04W 72/231
See application file for complete search history.

(56) References Cited

U.S. PATENT DOCUMENTS

| | | | |
|---|---|---|---|
| 8,005,039 | B2 | 8/2011 | Kamuf et al. |
| 11,405,909 | B2 | 8/2022 | Fan et al. |
| 2016/0100382 | A1 | 4/2016 | He et al. |
| 2016/0360437 | A1 | 12/2016 | Larsson et al. |
| 2017/0290046 | A1 | 10/2017 | Sun et al. |
| 2018/0123769 | A1 | 5/2018 | Pelletier et al. |

(Continued)

FOREIGN PATENT DOCUMENTS

| | | | | |
|---|---|---|---|---|
| CN | 103548409 A | | 1/2014 | |
| CN | 110166168 A | * | 8/2019 | ........... H04L 1/0007 |

(Continued)

OTHER PUBLICATIONS

International Search Report and Written Opinion—PCT/CN2020/083666—ISA/EPO—Dec. 31, 2020.

(Continued)

*Primary Examiner* — Phong La
(74) *Attorney, Agent, or Firm* — Loza & Loza, LLP

(57) ABSTRACT

The apparatus obtains a downlink control information (DCI) message transmitted in a physical downlink control channel (PDCCH). The DCI message may include control information for obtaining a plurality of downlink control information (DCI) messages included in a physical downlink shared channel (PDSCH). The apparatus receives the PDSCH including the plurality of DCI messages. The apparatus obtains one or more of the plurality of DCI messages in the PDSCH based on the control information.

24 Claims, 12 Drawing Sheets

(56) References Cited

U.S. PATENT DOCUMENTS

| | | | |
|---|---|---|---|
| 2018/0124753 A1 | 5/2018 | Sun et al. | |
| 2018/0368115 A1 | 12/2018 | Li et al. | |
| 2019/0007959 A1* | 1/2019 | Hwang | H04W 72/23 |
| 2019/0053097 A1 | 2/2019 | Rico Alvarino et al. | |
| 2019/0208540 A1 | 7/2019 | Kim et al. | |
| 2019/0393987 A1 | 12/2019 | Hong et al. | |
| 2020/0067530 A1 | 2/2020 | Xu et al. | |
| 2020/0267750 A1* | 8/2020 | Park | H04W 72/0446 |
| 2020/0328849 A1* | 10/2020 | Noh | H04L 1/1812 |
| 2020/0374881 A1 | 11/2020 | Kwak et al. | |
| 2020/0396760 A1 | 12/2020 | Yi et al. | |
| 2020/0404617 A1 | 12/2020 | Murray et al. | |
| 2021/0184798 A1 | 6/2021 | Park et al. | |
| 2021/0274536 A1* | 9/2021 | Shin | H04W 72/535 |
| 2021/0321414 A1* | 10/2021 | Yeo | H04L 1/1896 |
| 2022/0116967 A1* | 4/2022 | Yeo | H04W 72/23 |
| 2023/0026196 A1* | 1/2023 | Yang | H04W 72/20 |
| 2023/0156739 A1* | 5/2023 | Xu | H04W 72/23 370/329 |
| 2023/0309102 A1* | 9/2023 | Park | H04L 5/00 |
| 2024/0178946 A1* | 5/2024 | Islam | H04L 1/1887 |

FOREIGN PATENT DOCUMENTS

| | | | | |
|---|---|---|---|---|
| CN | 110226304 A | | 9/2019 | |
| CN | 110249558 A | | 9/2019 | |
| CN | 110351846 A | * | 10/2019 | H04L 5/0057 |
| CN | 110945793 A | | 3/2020 | |
| CN | 110958698 A | | 4/2020 | |
| CN | 110971368 A | | 4/2020 | |
| CN | 110932836 B | * | 12/2021 | H04L 1/16 |
| CN | 115843107 A | * | 3/2023 | H04L 1/1812 |
| EP | 3591881 A1 | | 1/2020 | |
| WO | 2018144683 A1 | | 8/2018 | |
| WO | 2018145126 | | 8/2018 | |
| WO | WO-2021179268 A1 | * | 9/2021 | H04L 1/1812 |
| WO | WO-2022239998 A1 | * | 11/2022 | H04L 5/0044 |

OTHER PUBLICATIONS

Qualcomm Incorporated: "PDCCH-Based Power Saving Channel Design", 3GPP Draft, 3GPP TSG-RAN WG1 #97, R1-1907294, PDCCH-based Power Saving Channel Design, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728734, 16 Pages, paragraph [2.2.3.1]—paragraph [2.2.3.3], p. 1-p. 15, Section 2.3.2, Section 2.1.

Supplementary European Search Report—EP20929965—Search Authority—The Hague—Oct. 17, 2023.

Qualcomm et al., "WF on 2-Stage DCI for NR", 3GPP Draft, 3GPP TSG RAN WG1 NR Ad-hoc, R1-1701478 WF on 2-Stage DCI for NR, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 1, 2017-Jan. 20, 2017 Jan. 20, 2017 (Jan. 20, 2017), XP051222474, pp. 1-3, the whole document.

* cited by examiner

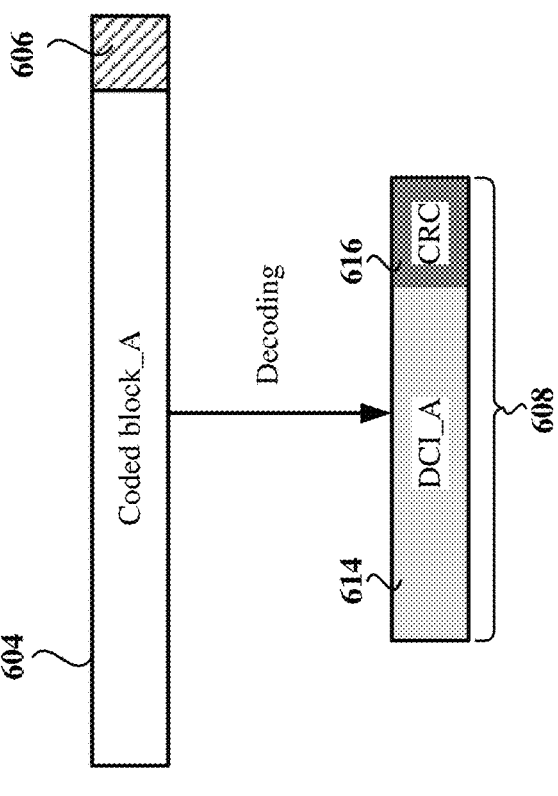
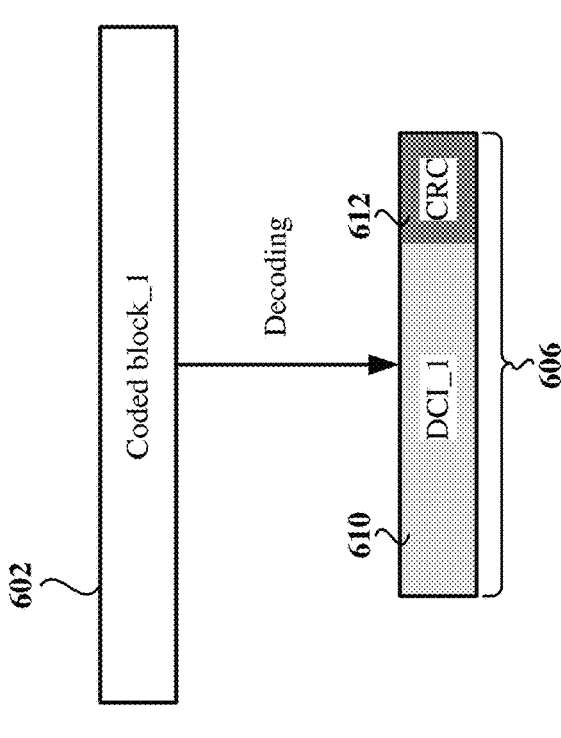
FIG. 6

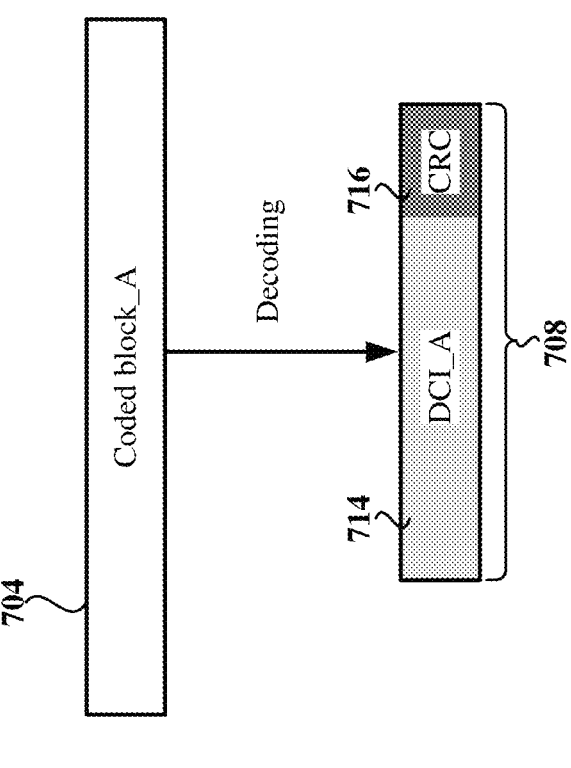
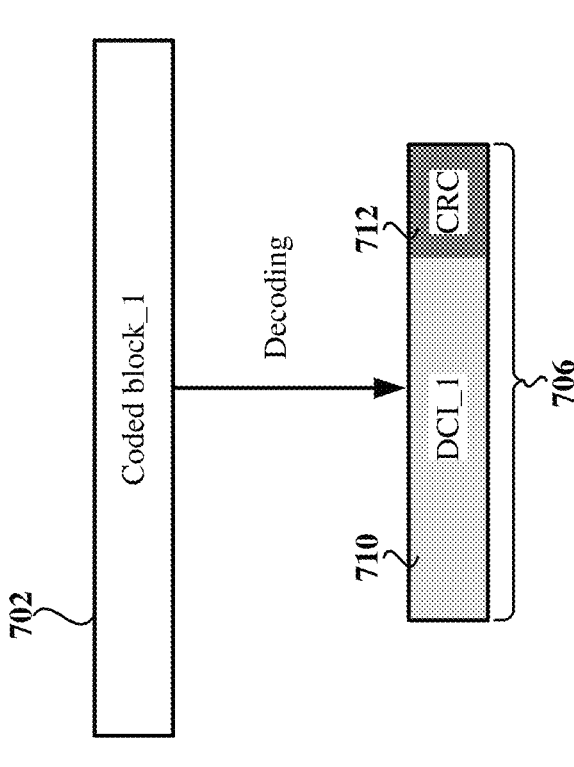
FIG. 7

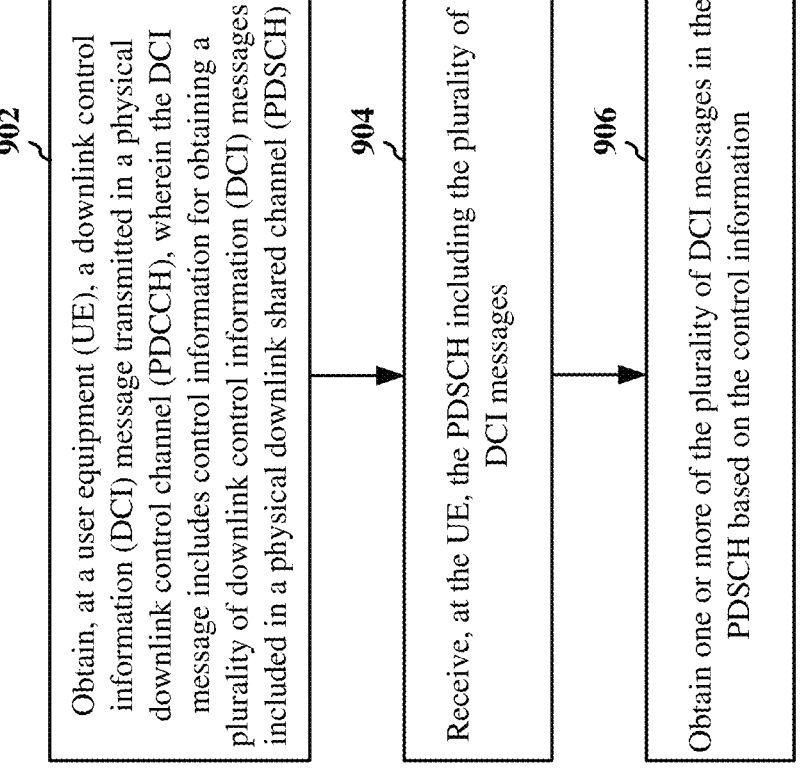

Obtain, at a user equipment (UE), a downlink control information (DCI) message transmitted in a physical downlink control channel (PDCCH), wherein the DCI message includes control information for obtaining a plurality of downlink control information (DCI) messages included in a physical downlink shared channel (PDSCH)

902

Receive, at the UE, the PDSCH including the plurality of DCI messages

904

Obtain one or more of the plurality of DCI messages in the PDSCH based on the control information

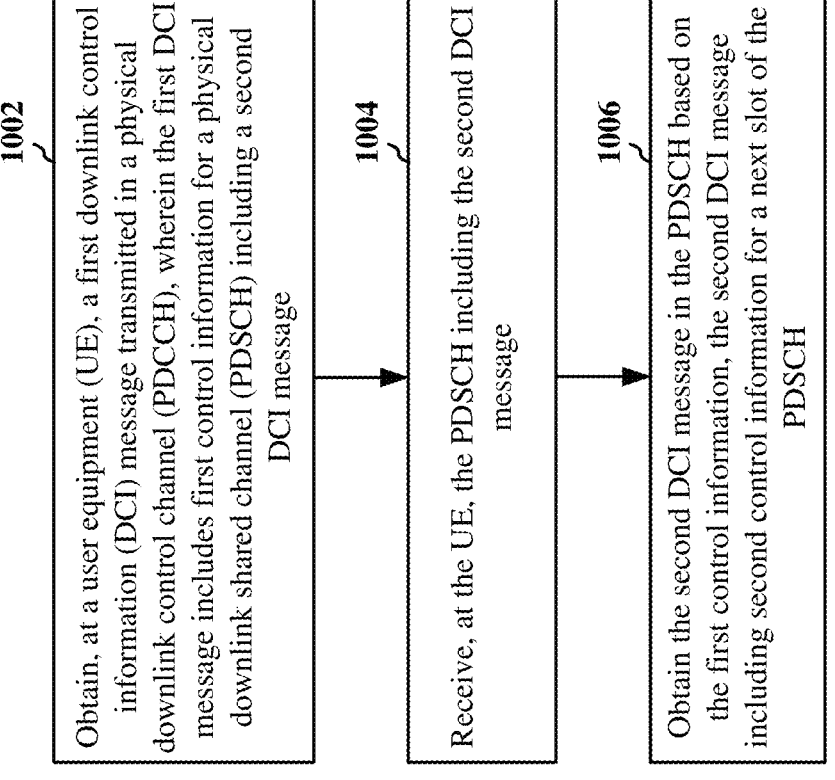

1002

Obtain, at a user equipment (UE), a first downlink control information (DCI) message transmitted in a physical downlink control channel (PDCCH), wherein the first DCI message includes first control information for a physical downlink shared channel (PDSCH) including a second DCI message

1004

Receive, at the UE, the PDSCH including the second DCI message

1006

Obtain the second DCI message in the PDSCH based on the first control information, the second DCI message including second control information for a next slot of the PDSCH

MULTIPLE DCIS TRANSMITTED OVER PDSCH

CROSS-REFERENCE TO RELATED APPLICATION(S)

This application is the U.S. national stage of PCT patent application number PCT/CN2020/083666 filed on Apr. 8, 2020.

BACKGROUND

Technical Field

The present disclosure relates generally to communication systems, and more particularly, to transmission of multiple downlink control information (DCI) messages over a physical downlink shared channel.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains a downlink control information (DCI) message transmitted in a physical downlink control channel (PDCCH). The DCI message includes control information for obtaining a plurality of downlink control information (DCI) messages included in a physical downlink shared channel (PDSCH). The apparatus receives the PDSCH including the plurality of DCI messages. The apparatus obtains one or more of the plurality of DCI messages in the PDSCH based on the control information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating the separate decoding of coded blocks to obtain the DCI messages included in the PDSCH in accordance with various aspects of the present disclosure.

FIG. 7 is a diagram illustrating the separate decoding of coded blocks to obtain the DCI messages included in the PDSCH in accordance with various aspects of the present disclosure.

FIG. 9 is a flowchart of a method of wireless communication in accordance with various aspects of the present disclosure.

FIG. 10 is a flowchart of a method of wireless communication in accordance with various aspects of the present disclosure.

DETAILED DESCRIPTION

Figure 1:
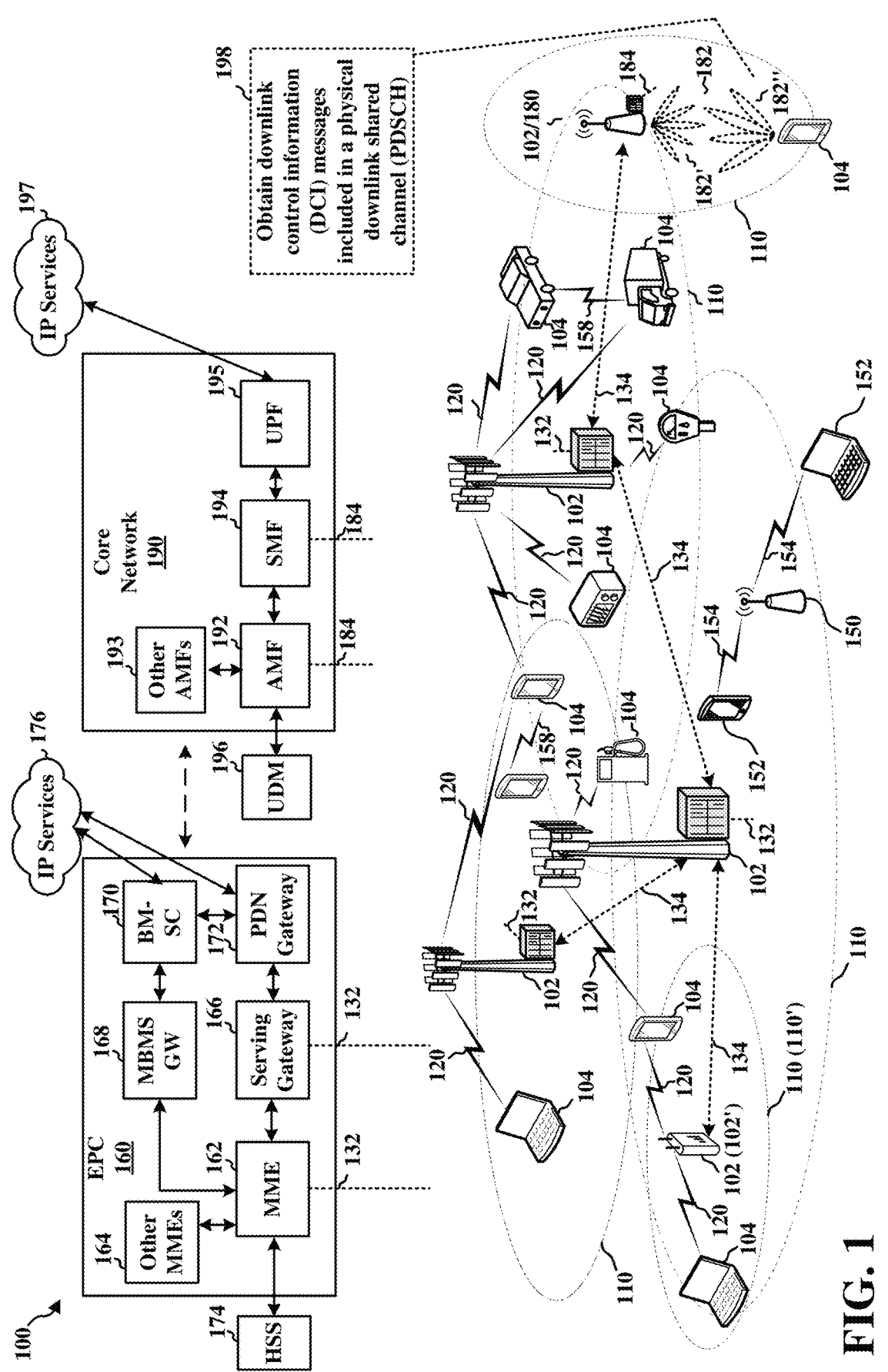
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to obtain downlink control information (DCI) messages included in a physical downlink shared channel (PDSCH) 198.

Figures 2A, 2B, 2C, 2D:
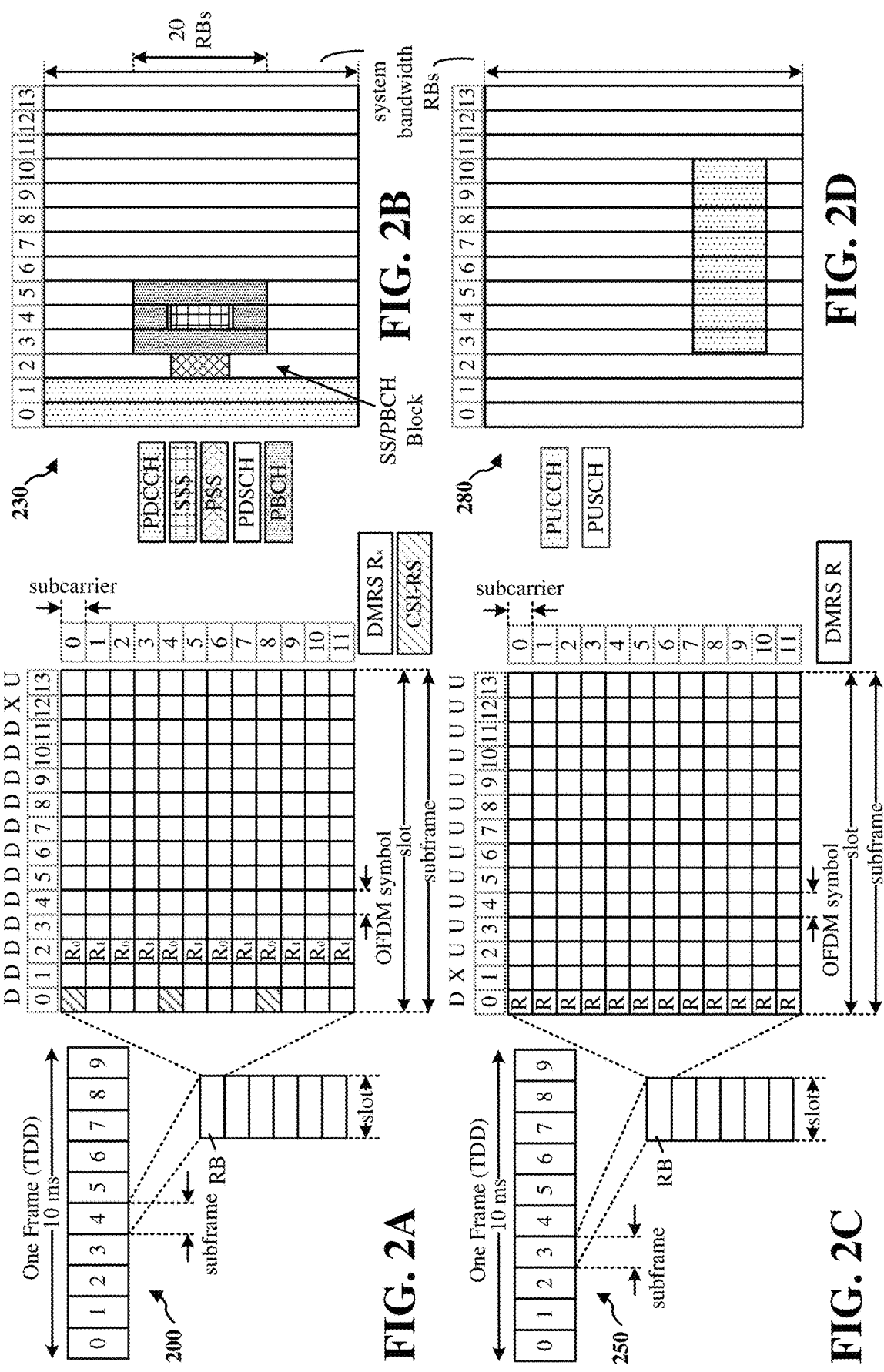
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
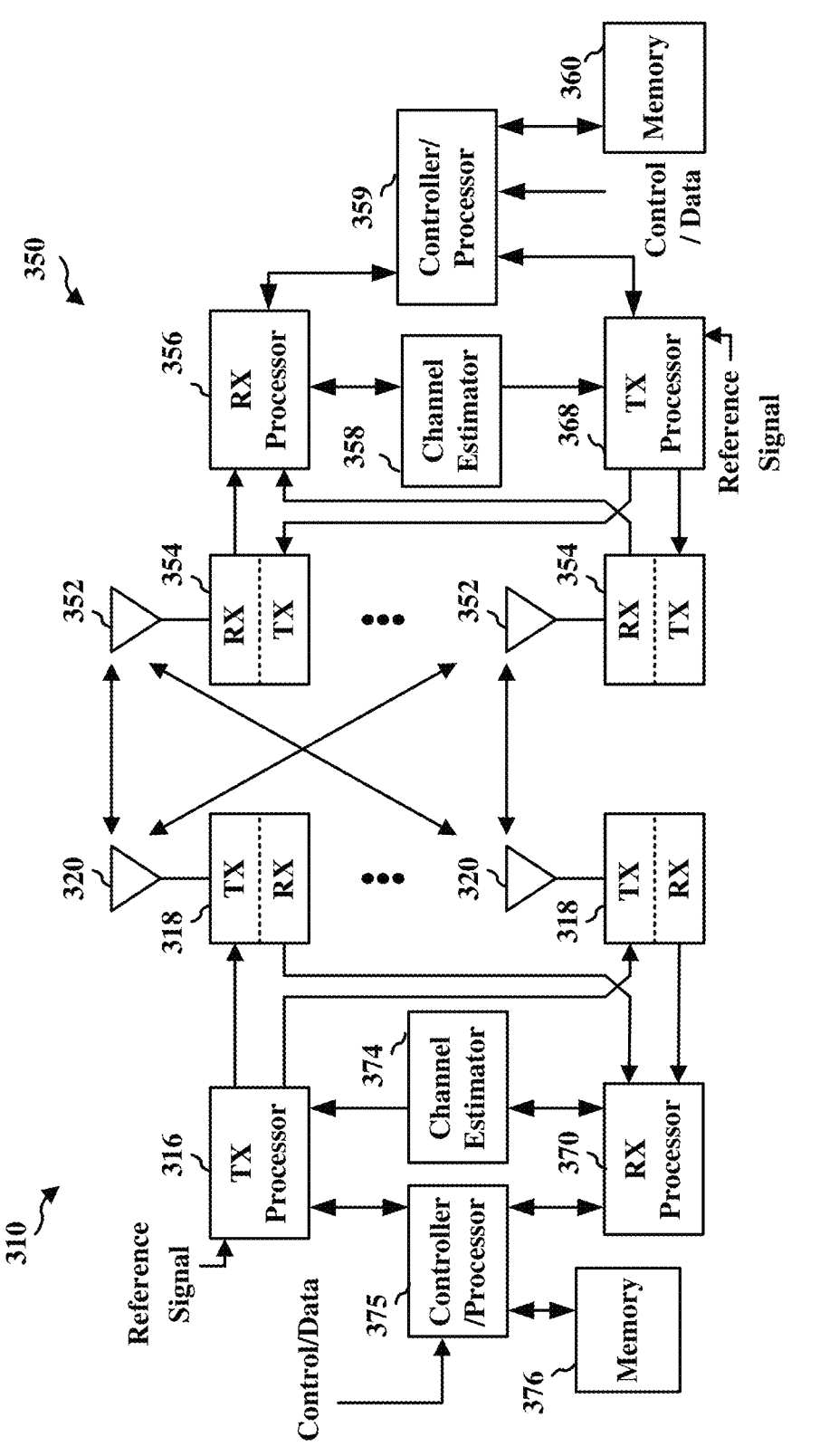
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

A UE may transmit an uplink control information (UCI) message in a physical uplink shared channel (PUSCH). This may be referred to as piggybacking the UCI message in the PUSCH. In some examples, and as previously described, the UCI message may include scheduling requests, a channel quality indicator (CQI), a precoding matrix indicator (PMI), a rank indicator (RI), and HARQ ACK/NACK feedback.

For the rate matching of the UCI message in the PUSCH, a code rate offset factor $\beta_{offset}$ (e.g., $\beta_{offset} > 1$) may be used to achieve a lower code rate than the code rate indicated by a modulation and coding scheme (MCS) for the PUSCH. The number of resource elements (REs) per layer for the UCI message may be determined using equation (1):

$$N_{RE,UCI} = \frac{K_{UCI} \cdot \beta_{offset}}{K_{UL-SCH}} N_{RE} \qquad \text{(equation 1)}$$

where $N_{RE,UCI}$ represents the number of resource elements (REs) per layer for the UCI message, $K_{UCI}$ represents the payload size of the UCI message including cyclic redundancy check (CRC) (if any), $\beta_{offset}$ represents a code rate offset factor, $K_{UL-SCH}$ represents the uplink shared channel (UL-SCH) payload size including transport block (TB)/code block (CB) cyclic redundancy check (CRC) bits, and $N_{RE}$ represents the total number of REs per layer of the PUSCH. It should be understood that equation (1) represents a simplified equation for the determination of $N_{RE,UCI}$ for ease of understanding and that the determination of $N_{RE,UCI}$ may be more complex in some cases.

In some examples, to prevent the UCI message from occupying more PUSCH resources than is necessary or desired, a portion factor $\alpha \in \{0.5, 0.65, 0.8, 1.0\}$ may be used to limit the maximum portion of PUSCH resources that the UCI message may occupy. In these examples, $N_{RE,UCI}$ may be determined using equation (2):

$$N_{RE,UCI} = \min\left(\frac{K_{UCI} \cdot \beta_{offset}}{K_{UL-SCH}} N_{RE}, \alpha \cdot N_{RE}\right). \qquad \text{(equation 2)}$$

Polar codes have been adopted as the channel coding technique for control channels (e.g., PDCCH) in 5G NR networks. In some examples, the maximum coded block size may be 512 bits for downlink transmissions and 1024 bits for uplink transmissions. The minimum coding rate may be 1/8. The maximum payload size without CRC may be 140 bits, and a 24-bit CRC may be appended to the payload. Rate-matching schemes may include shortening, puncturing and repetition. The decoding complexity may be expressed as $O(N \times \log_2(N))$, where N is the number of coded bits. In other words, decoding complexity may not be a direct function of coding rate. There may be coding gain loss with more information bits.

Determination of a coded block size will now be described. In one example, K may represent a number of data bits (also referred to as information bits, payload, or payload size) to be encoded. K may be a positive integer value and the K number of data bits may be expressed as a sequence of bits $c_0, c_1, c_2, \ldots, c_{K-1}$. The K number of data bits may be encoded with a polar code to produce $N=2^n$ encoded bits, where N represents the code length of the polar code (also referred to as a mother code size N). For example, the N encoded bits may be expressed as a sequence of bits $d_0, d_1, d_2, \ldots, d_{N-1}$. In determining the code length $N=2^n$ of the polar code, the value of n may be determined using equation (3):

$$n = \max\{\min\{n_1, n_2, n_{max}\}, n_{min}\}. \qquad \text{(equation 3)}$$

where $n_{min}$ and $n_{max}$ provide a lower and upper bound on the code length, respectively. In some examples, $n_{min}=5$ and $n_{max}=9$ for a downlink channel. The parameter $$n_2 = \left\lceil \log_2\left(\frac{K}{R_{min}}\right) \right\rceil$$

sets an upper bound on the code rate based on the minimum code rate $R_{min}$ admitted by the encoder (e.g., $R_{min}=1/8$). The value of the parameter $n_1$ may be dependent on the rate matching scheme and is usually defined as $n_1 = \lceil \log_2 E \rceil$, where E represents the code length (also referred to as the coded block size) after rate matching. However, if $$E \le \left(\frac{9}{8}\right) \cdot 2^{(\lceil \log_2 E \rceil - 1)} \text{ and } \frac{K}{E} < \frac{9}{16},$$

then $n_1$ may be defined as $n_1 = \lceil \log_2 E \rceil - 1$.

In the aspects described herein, multiple DCI messages may be transmitted in a PDSCH. As used herein, the terms "DCI" and "DCI message" are interchangeable. This may be referred to as piggybacking the DCI messages in the PDSCH. In some aspects of the disclosure, multiple DCI messages may be transmitted in the PDSCH in situations where the PDCCH may not have adequate resources to carry one or more of the multiple DCI messages. These situations may arise when the CORESET is reduced (e.g., when a base station is operating in a traditional sub 6 GHz spectrum, in millimeter wave (mmW) frequencies, etc.) and cannot accommodate the multiple DCI messages. For example, the DCI messages may be an aggregation of multiple DL/UL grants. In some cases, the delivery of these DL/UL grants in the PDSCH may be more efficient than transmitting them in a PDCCH, which would require a UE to perform blind decoding.

When the aggregated length of the multiple DCI messages to be transmitted to a UE is larger than the maximum of 164 bits supported in the PDCCH, segmentation of a transport block (TB) into multiple code blocks (CBs) may be performed. For example, one of several types of segmentation schemes may be used to perform the segmentation of the transport block (TB). These aggregation and segmentation schemes may improve coding gain and unitary protection. However, separately encoding each DCI message with a single code block may still provide acceptable performance. In this case, a UE may attempt to decode each of the separately encoded DCI messages and may use the successfully decoded DCI messages.

Determination of a total resource size of the multiple DCI messages included in the PDSCH and the allocation of resources for each DCI message encoded in a single code block will now be described. In some aspects of the disclosure, the base station may transmit multiple separately encoded DCI messages in an allocated PDSCH region, together with other data, to the same UE. The multiple separately encoded DCI messages may have the same size (e.g., same code length or payload size) and may be rate matched into the allocated PDSCH region.

Figure 4:
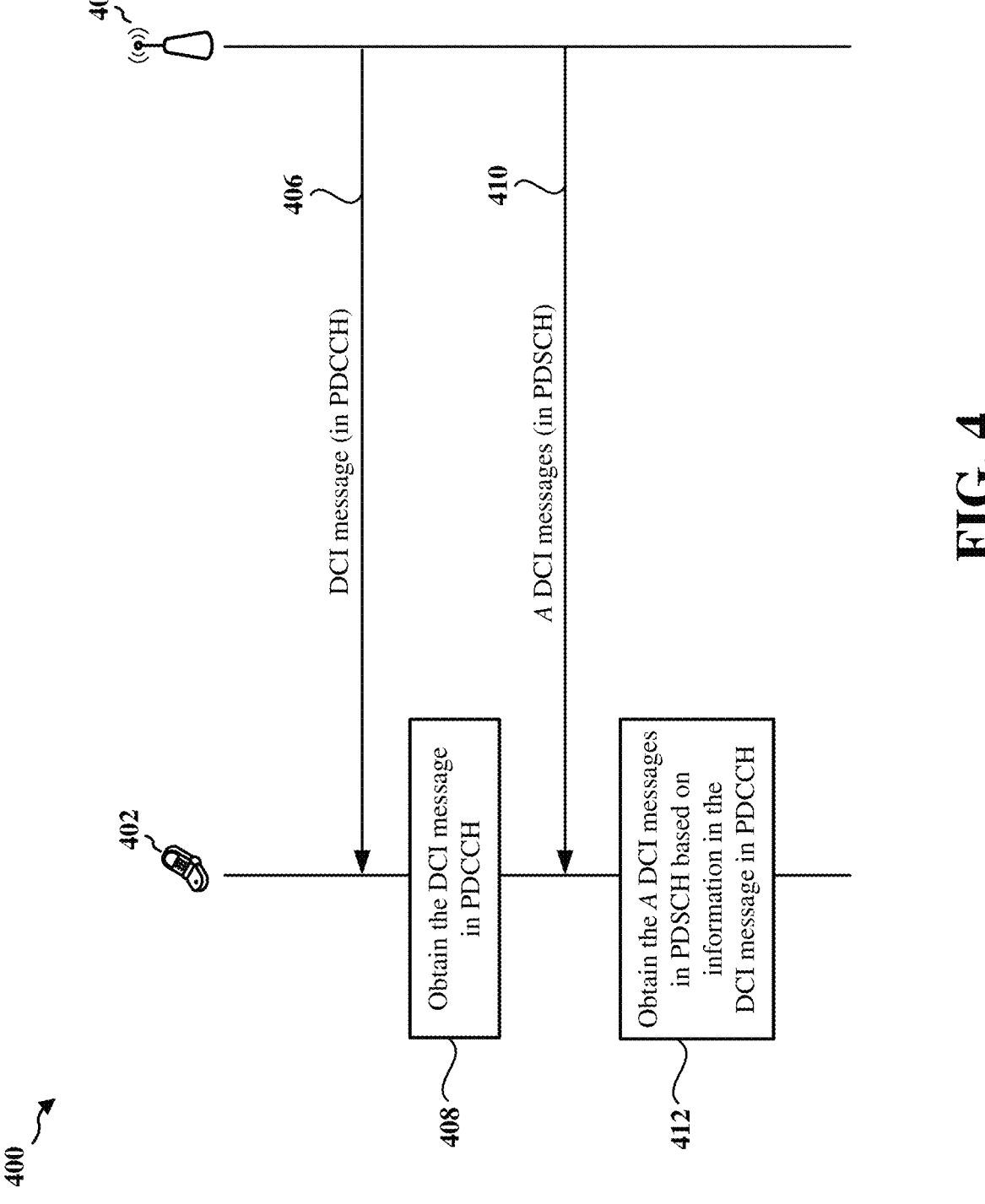
FIG. 4 is a signal flow diagram in accordance with various aspects of the present disclosure.
Figure 5:
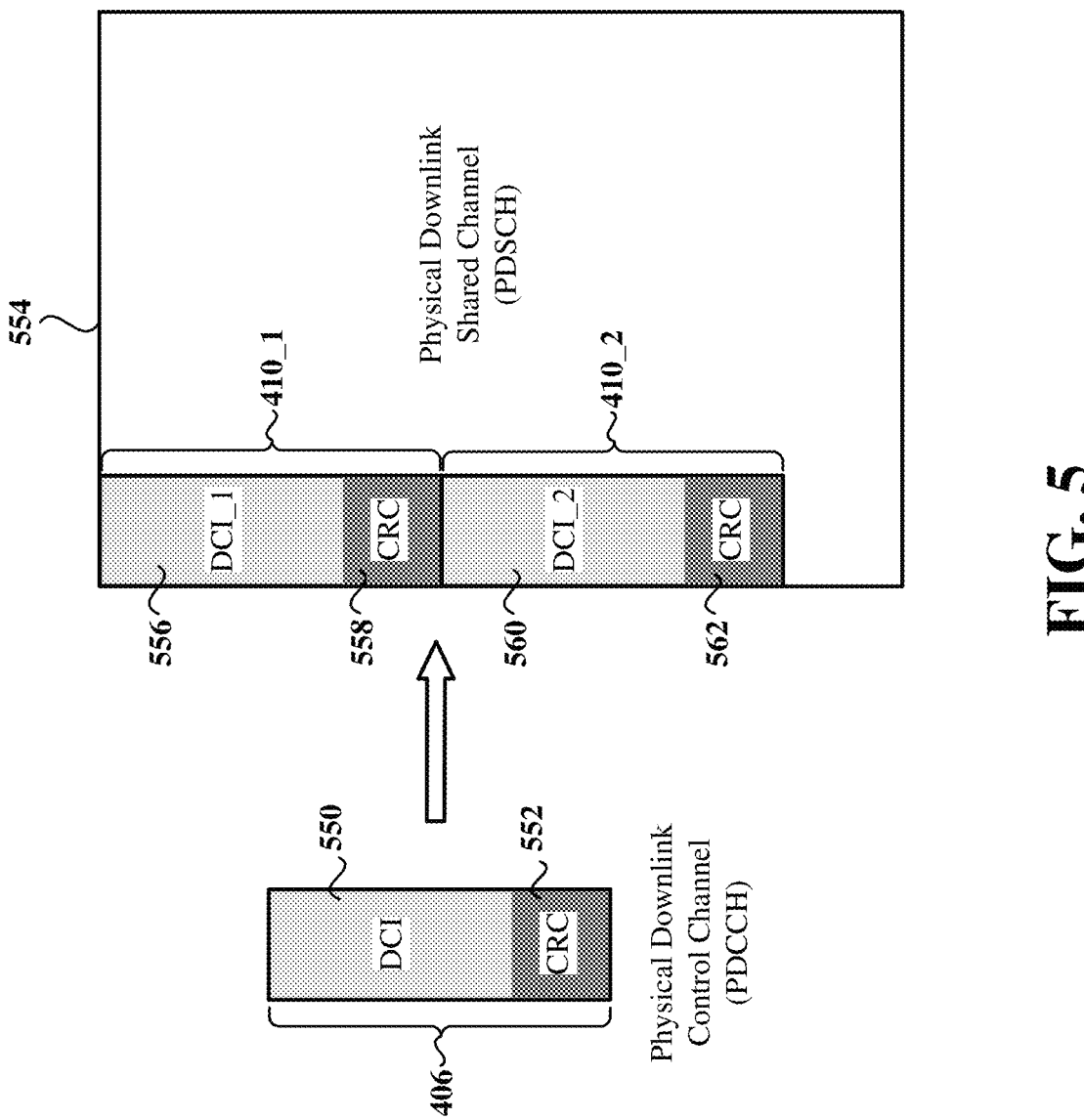
FIG. 5 is a diagram illustrating downlink control information (DCI) messages included in a physical downlink shared channel (PDSCH) in accordance with various aspects of the present disclosure.

FIG. 4 is a signal flow diagram in accordance with various aspects of the present disclosure. As shown in FIG. 4, a base station 404 may transmit a DCI message 406 to a UE 402 in a PDCCH. For example, with reference to FIG. 5, the DCI message 406 may include DCI bits 550 and CRC bits 552. As further shown in FIG. 4, the UE 402 may obtain 408 the DCI message 406 in the PDCCH by performing blind decoding (also referred to as blind detection). For example, the UE 402 may perform blind decoding by checking all possible PDCCH locations, PDCCH formats, and DCI formats, and acting on the messages with correct CRCs. In some aspects of the disclosure, the DCI message 406 may include control information for the PDSCH, a number A representing the number of DCI messages included in a PDSCH, and a downlink (DL) code rate offset factor $\beta_{offset}^{DL}$. For example, A may be an integer that is greater than or equal to two. For the rate matching of the DCI message in the PDSCH, the DL code rate offset factor $\beta_{offset}^{DL}$ (e.g., $\beta_{offset}>1$) may be used to achieve a lower code rate than the code rate indicated by a modulation and coding scheme (MCS) for the PDSCH.

As shown in FIG. 4, the base station 404 may transmit A DCI messages 410 to the UE 402 in a PDSCH. For example, with reference to FIG. 5, in a scenario where two DCI messages (e.g., A=2) are transmitted to the UE 402 in the PDSCH, the DCI messages 410 may include a first DCI message 410_1 and a second DCI message 410_2 in a PDSCH 554. The first DCI message 410_1 may include DCI bits 556 (indicated as "DCI_1" in FIG. 5) and CRC bits 558, and the second DCI message 410_2 may include DCI bits 560 (indicated as "DCI_2" in FIG. 5) and CRC bits 562.

As further shown in FIG. 4, the UE 402 may obtain 412 the A DCI messages 410 in PDSCH based on information in the DCI message 406 in the PDCCH. In some aspects of the disclosure, the UE 402 may determine the sizes of the A DCI messages included in a region of the PDSCH (also referred to as a DCI piggyback region). In some examples, the A DCI messages 410 may be zero padded to the same size. For example, the bit length of the first DCI message 410_1 (e.g., the sum of the DCI bits 556 and the CRC bits 558) may be equal to the bit length of the second DCI message 410_2 (e.g., the sum of the DCI bits 560 and the CRC bits 562). In some examples, each of the A DCI messages 410 may have the same size (e.g., the same bit length) as the DCI message 406. The UE 402 may further determine the number of resource elements (RE) for each of the A DCI messages 410 and may decode the code blocks.

In scenarios where there codeword size is irregular, the UE may determine the total number of REs allocated for the A DCI messages 410 using equation (4):

$$N_{RE,DCI} = \frac{A \cdot K_{DCI} \cdot \beta_{offset}^{DL}}{K_{DL-SCH}} N_{RE} \qquad \text{(equation 4)}$$

where $N_{RE,DCI}$ is the total number of REs allocated for the A DCI messages 410, $K_{DCI}$ is the payload size for each of the A DCI messages 410 after zero padding, $\beta_{offset}^{DL}$ is the DL code rate offset factor (e.g., $\beta_{offset}^{DL}>1$), $K_{DL-SCH}$ is the payload size of the downlink shared channel (DL-SCH) including TB/CB CRC bits, and $N_{RE}$ is the total number of REs per layer of the PDSCH. It should be understood that equation (4) represents a simplified equation for the determination of $N_{RE,DCI}$ for ease of understanding and that the determination of $N_{RE,DCI}$ may be more complex in some cases.

In some aspects of the disclosure, the UE 402 may be configured to separately decode each of the A DCI messages 410 from a single code block. For example, the UE 402 may first determine the coded bits belonging to each coded block. The UE 402 may then decode each coded block separately to obtain each DCI message. This approach is illustrated in FIG. 6. As shown in FIG. 6, the UE 402 may first determine the A coded blocks carrying the A DCI messages 410. For example, the A coded blocks may include a first coded block 602 (labeled as "Coded block_1" in FIG. 6) through an Ath coded block 604 (labeled as "Coded block_A" in FIG. 6). The Ath coded block 604 may represent the last coded block. The UE 402 may decode the first coded block 602 to obtain a first DCI message 606, where the DCI message 606 includes DCI bits 610 and CRC bits 612. The UE 402 may finally decode the Ath coded block 604 to obtain an Ath DCI message 608, where the DCI message 608 includes DCI bits 614 and CRC bits 616.

To determine the coded bits belonging to each coded block, the UE 402 may first determine the total number of coded bits carrying the A DCI messages 410. For example, the total number of coded bits may be $M=N_{RE,DCI} \cdot Q_m$, where $Q_m$ is the number of data modulation bits over a single modulation symbol (e.g., $Q_m=2$, 4, 6 for QPSK, QAM16, QAM64, respectively). The UE 402 may then determine the number of coded bits for each coded block carrying a DCI message. In some aspects of the present disclosure, the UE 402 may uniformly split the REs of different DCI messages. In these aspects, for example, the UE 402 may determine the number of coded bits for each coded block (e.g., for each DCI message) using the ratio M/A. The UE 402 may assign any residual coded bits 606 (e.g., $M-\lfloor M/A \rfloor \cdot A$ bits) to the last code block. In some examples, the UE 402 may use $K=K_{DCI}$ and $E=\lfloor M/A \rfloor$ to determine the mother code size N (e.g., $N=2^n$). After determining the coded bits belonging to each coded block, the UE 402 may then proceed to decode each coded block separately. Therefore, even if one or more of the coded blocks cannot be decoded, the UE 402 may still be able to successfully obtain the DCI messages from the remaining coded blocks.

In other aspects of the disclosure, instead of uniformly splitting the REs of different A DCI messages 410 as previously described, the UE 402 may split the coded bits to different DCI messages at the RE level. With this approach, for example, each of the A DCI messages 410 may include $\lfloor N_{RE,DCI}/A \rfloor$ REs, except for the final DCI message of the A DCI messages 410, which will also include the residual bits. The UE 402 may split the total number of REs (e.g., $N_{RE,DCI}$) allocated for the A DCI messages 410 based on the number of REs (e.g., $\lfloor N_{RE,DCI}/A \rfloor$) carrying each of the A DCI messages 410 to obtain a number of coded blocks. The UE 402 may then decode each of the coded blocks separately to obtain each DCI message.

In scenarios where the codeword size is uniform, the UE 402 may determine the total number of REs allocated for the A DCI messages 410 (e.g., $N_{RE,DCI}$) using equation (5) or equation (6):

$$N_{RE,DCI} = A \left\lfloor \frac{K_{DCI} \cdot \beta_{offset}^{DL}}{K_{DL-SCH}} N_{RE} \right\rfloor \qquad \text{(equation 5)}$$

$$N_{RE,DCI} = A \left\lceil \frac{K_{DCI} \cdot \beta_{offset}^{DL}}{K_{DL-SCH}} N_{RE} \right\rceil \qquad \text{(equation 6)}$$

where $N_{RE,DCI}$, A, $K_{DCI}$, $\beta_{offset}^{DL}$, $K_{DL-SCH}$, and $N_{RE}$ are each described herein with reference to equation (4). It should be noted that equation (5) includes a floor function while equation (6) includes a ceiling function. Therefore, either equation (5) or equation (6) may ensure that the value of $N_{RE,DCI}$ (e.g., the total number of REs allocated for the A DCI messages 410) is a multiple of A.

In some aspects of the disclosure, the UE 402 may be configured to separately decode each of the A DCI messages 410 from a single code block. For example, the UE 402 may first determine the coded bits belonging to each coded block. The UE 402 may then decode each coded block separately to obtain each DCI message. This approach is illustrated in FIG. 7. As shown in FIG. 7, the UE 402 may first determine the A coded blocks carrying the A DCI messages 410. For example, the A coded blocks may include a first coded block 702 (labeled as "Coded block_1" in FIG. 7) through an Ath coded block 704 (labeled as "Coded block_A" in FIG. 7). The Ath coded block 704 may represent the last coded block. The UE 402 may decode the first coded block 702 to obtain a first DCI message 706, where the DCI message 706 includes DCI bits 710 and CRC bits 712. The UE 402 may finally decode the Ath coded block 704 to obtain an Ath DCI message 708, where the DCI message 708 includes DCI bits 714 and CRC bits 716.

To determine the coded bits belonging to each coded block, the UE 402 may first determine the total number of coded bits carrying the A DCI messages 410. For example, the total number of coded bits may be $M=N_{RE,DCI} \cdot Q_m$, where $Q_m$ is the number of data modulation bits over a single modulation symbol (e.g., $Q_m=2$, 4, 6 for QPSK, QAM16, QAM64, respectively). The UE 402 may then determine the number of coded bits for each coded block carrying a DCI message. In some aspects of the present disclosure, the UE 402 may uniformly split the REs of different DCI messages. In these aspects, for example, the UE 402 may determine the number of coded bits for each coded block (e.g., for each DCI message) using the ratio M/A. In some examples, the UE 402 may use $K=K_{DCI}$ and $E=\lfloor M/A \rfloor$ to determine the mother code size N (e.g., $N=2^n$). After determining the coded bits belonging to each coded block, the UE 402 may then proceed to decode each coded block separately. Therefore, even if one or more of the coded blocks cannot be decoded, the UE 402 may still be able to successfully obtain the DCI messages from the remaining coded blocks.

Blind Decoding of DCI Message Having Different Sizes

In some aspects of the disclosure, the A DCI messages 410 in the PDSCH may have different sizes (e.g., different bit lengths). For example, in one scenario, the PDSCH may include a first DCI message with DCI format 0_1 and a second DCI message with DCI format 1_1, where the first and second DCI messages have different sizes. For example, in another scenario, the PDSCH may include a first DCI message with DCI format 0_1, a second DCI message with DCI format 1_1, a third DCI message with DCI format 0_2, and a fourth DCI message with DCI format 1_2. In this scenario, the first and second DCI messages may have the same size, but the third and/or fourth DCI messages may have a different size relative to the first and second DCI messages.

When the A DCI messages 410 in the PDSCH have different sizes, the UE 402 may apply different assumptions regarding the payload size of each DCI message and may perform multiple decoding operations to obtain the A DCI messages 410. However, it may be difficult for the UE 402 to apply the different assumptions to determine the total payload size of the A DCI messages 410, which is needed for the determination of the number of REs (e.g., $N_{RE,DCI}$).

In some aspects of the disclosure, if the A DCI messages 410 may include DCI messages having different sizes, the UE 402 may use a nominal DCI payload size when determining the total payload size of the A DCI messages 410 and the number of REs for each DCI message. The REs may still be uniformly split between the A DCI messages 410. As a result, the coding gain for smaller DCI messages may be higher. For example, whereas the previously described payload size $K_{DCI}$ may vary for DCI messages with different DCI formats, the UE 402 may instead use a nominal payload size $K_{DCI}'$ (e.g., a common value used for different DCI message sizes) for determination of the K and E values.

It should be noted that when decoding the PDCCH, the UE 402 may attempt different $K_{DCI}$ values, which may significantly increase decoding complexity. Therefore, the previously described aspects of the present disclosure including the use of the nominal payload size $K_{DCI}'$ may achieve a suitable compromise between decoding complexity (e.g., the number of decoding operations that need to be performed by the UE 402) and coding gaps (e.g., avoiding zero padding).

Decoding Multiple DCI Messages Having Different Sizes without Blind Decoding

In some aspects of the disclosure, to avoid blind decoding (reduce complexity), the UE 402 may receive information that indicates the sizes of the multiple DCI messages included in the PDSCH. For example, the UE 402 may receive the information via RRC configuration and/or a DCI message in the PDCCH.

In some aspects of the disclosure, if all of the DCI messages in the PDSCH have the same size, the UE 402 may receive control information indicating the size of the DCI messages. For example, the UE 402 may receive the control information via a DCI message in the PDCCH. In some aspects of the present disclosure, all of the DCI messages in the PDSCH may be configured have a same size that is selected from a set of candidate DCI message sizes. For example, the set of candidate DCI message sizes may include a first size and a second size, where the first size is different from the second size. In this example, the control information may indicate the first size or the second size. The control information may be a single bit, where the single bit is set to a first value (e.g., the single bit is set to '0') to indicate the first size and set to a second value (e.g., the single bit is set to '1') to indicate the second size. The set of candidate DCI message sizes (e.g., the first and second sizes) may be configured via RRC configuration. In other examples, the previously described set of candidate DCI message sizes may include more than two candidate DCI message sizes.

In some aspects of the disclosure, two sets of control information may be included in the DCI message in the PDCCH. The first set of control information may indicate to the UE 402 the number of DCI messages having a first size and a first code rate offset factor for the DCI messages having the first size, and the second set of control information may indicate to the UE 402 the number of DCI messages having a second size and a second code rate offset factor for the DCI messages having the second size. The first size may be different from the second size. In some examples, the first and second code rate offset factors may be the same for the DCI messages having the first and second sizes.

In some implementations, the order (e.g., with respect to DCI message size) in which the DCI messages of different sizes appear in the DCI piggyback region of the PDSCH may be predetermined and known by the UE 402. For example, DCI messages having the first size may appear in the PDSCH before DCI messages having the second size, where the first size is smaller than the second size. Alternatively, the DCI messages having the second size may appear in the PDSCH before DCI messages having the first size. The two candidate DCI message sizes (e.g., the first and second DCI message sizes) may be configured via an RRC configuration. In this case, for example, the UE 402 may accurately determine the total payload size of the A DCI messages 410 by summing the payload sizes of the different DCI messages having different sizes. The number of REs may be allocated differently/proportionally between the DCI messages having different sizes. In other examples, more than two candidate DCI message sizes may be configured.

In some aspects of the present disclosure, the PDSCH may include (e.g., in a DCI message piggyback region of the PDSCH) different combinations of DCI message formats and DCI message sizes in a PDSCH transmission. In one aspect, the DCI messages included in the PDSCH may be configured to have one size. For example, the DCI messages may have the same size and may be based on the DCI format 0_1 and the DCI format 1_1. As another example, the DCI messages may have the same size and may be based on the DCI format 0_2 and the DCI format 1_2.

In another aspect, the DCI messages included in the PDSCH may be configured to have two sizes. For example, the DCI messages may have one size for the DCI format 0_1 and another size for the DCI format 1_1. As another example, two DCI message size configurations may be selected from a set of DCI message size configurations. The set of DCI message size configurations may include a first configuration where the DCI messages may have the same size and may be based on the DCI format 0_1 and the DCI format 1_1, a second configuration where the DCI messages may have the same size and may be based on the DCI format 0_2 and the DCI format 1_2, and a third configuration where the DCI messages may have the same size and may be based on the DCI format 0_0 and the DCI format 1_0.

In another aspect, the DCI messages included in the PDSCH may be configured to have three different DCI message sizes. For example, DCI messages based on the DCI format 0_1 and the DCI format 1_1 may both have a first size, DCI messages based on the DCI format 0_2 and the DCI format 1_2 may both have a second size, and DCI messages based on the DCI format 0_0 and the DCI format 1_0 may both have a third size. The previously discussed first, second, and third sizes may be different from one another. It should be understood that the previously described combinations of DCI message formats and DCI message sizes are not intended to be exhaustive and that additional and/or different combinations relative to those described herein may be used.

In some aspects of the present disclosure, the number of DCI messages included in the PUSCH or the PDSCH may be based on a capability of a UE (e.g., UE 104). For example, since low performance UEs may not be able to support decoding of multiple DCI messages piggybacked in the PDSCH, such low performance UEs may still be able to decode a single DCI message piggybacked in the PDSCH. Therefore, in some aspects of the disclosure, only a single DCI message may be allowed in the PUSCH or the PDSCH. With respect to the uplink (UL), for example, the UE may use a multi-PUSCH grant to grant multiple slots. With respect to the downlink (DL), for example, a DCI message in one slot of the PDSCH (e.g., in a piggyback region of the PDSCH) may include control information (e.g., a DL grant) for a next slot of the PDSCH. The next slot of the PDSCH may include another DCI message (e.g., in a piggyback region of the next slot of the PDSCH). An example implementation of this aspect is illustrated in FIG. 8.

Figure 8:
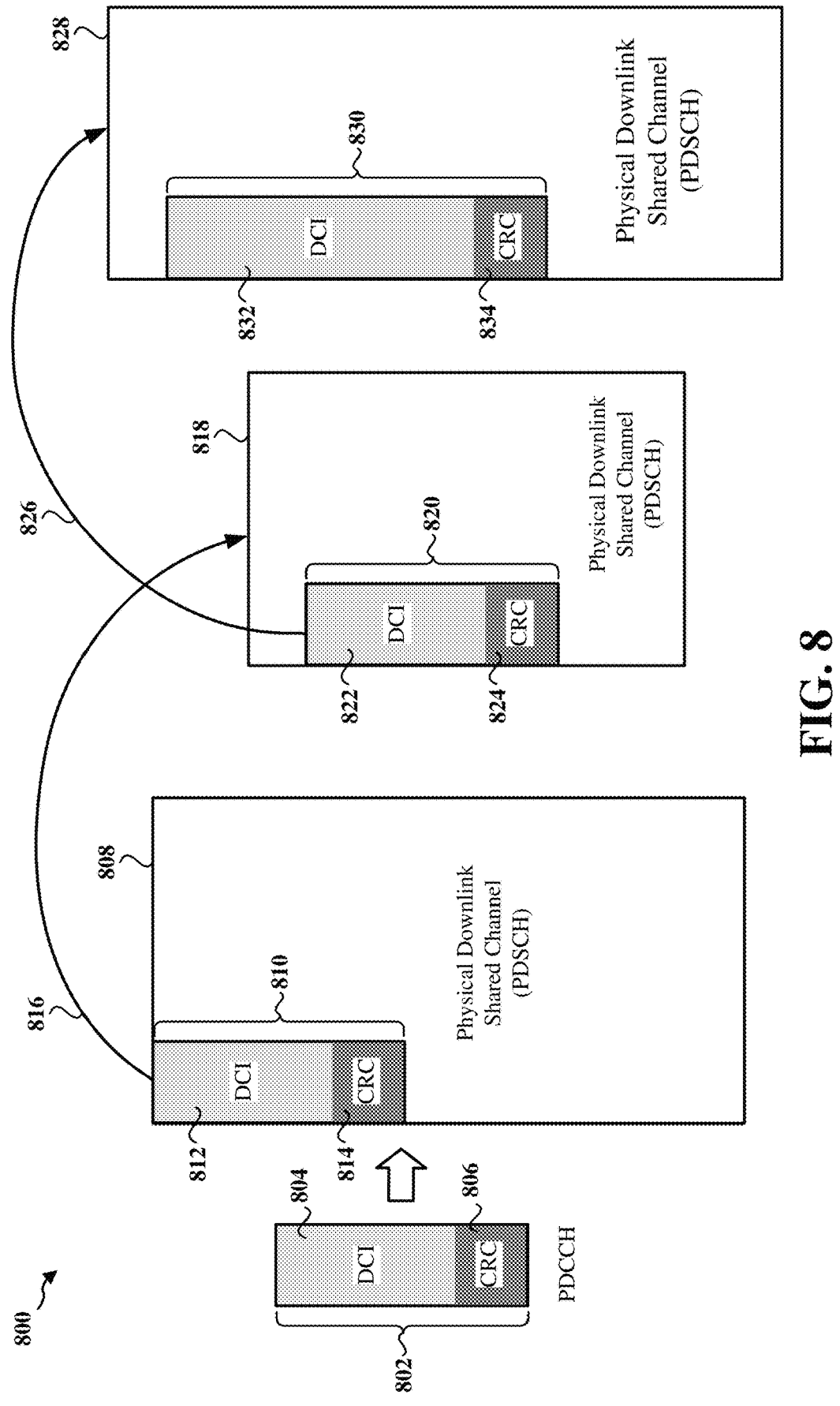
FIG. 8 is a diagram illustrating single DCI messages piggybacked in PDSCH in accordance with various aspects of the present disclosure.

FIG. 8 shows a DCI message 802 included in the PDCCH, where the DCI message 802 includes DCI bits 804 and CRC bits 806. The UE may use blind decoding to obtain the DCI message 802 from the PDCCH. The DCI message 802 may indicate the control information for first PDSCH resources 808. As shown in FIG. 8, the first PDSCH resources 808 may include a DCI message 810, where the DCI message 810 includes DCI bits 812 and CRC bits 814. As indicated with the arrow 816 in FIG. 8, the DCI message 810 may indicate the control information for second PDSCH resources 818. The second PDSCH resources 818 may include a DCI message 820, where the DCI message 820 includes DCI bits 822 and CRC bits 824. As indicated with the arrow 826 in FIG. 8, the DCI message 820 may indicate the control information for third PDSCH resources 828. The third PDSCH resources 828 may include a DCI message 830, where the DCI message 830 includes DCI bits 832 and CRC bits 834.

In the aspects described with reference to FIG. 8, transmission of the piggybacked DCI messages 810, 820, 830 to the UE may not require a control region (e.g., a CORESET) and may not require rate matching. Furthermore, the piggybacked DCI messages 810, 820, 830 may be decoded based on the aspects described herein and, therefore, the UE may not need to perform blind decoding to obtain the DCI messages 810, 820, 830. Accordingly, the UE may avoid additional processing and may reduce power consumption.

FIG. 9 is a flowchart 900 of a method of wireless communication. The method may be performed by a UE (e.g., the UE 104, 402; the apparatus 1102/1102'; the processing system 1214, which may include the memory 360 and which may be the entire UE 104, 402 or a component of the UE 104, 402, such as the TX processor 368, the RX processor 356, and/or the controller/processor 359).

At 902, the UE obtains a downlink control information (DCI) message transmitted in a physical downlink control channel (PDCCH). The DCI message includes control information for obtaining a plurality of downlink control information (DCI) messages included in a physical downlink shared channel (PDSCH).

In some aspects of the disclosure, the control information indicates at least a total number of the plurality of DCI messages and a code rate offset factor. For example, the total number of the plurality of DCI messages may be represented by the parameter A and the code rate offset factor may be the DL code rate offset factor $\beta_{offset}^{DL}$, where $\beta_{offset}^{DL} > 1$.

In some aspects of the disclosure, each of the plurality of DCI messages in the PDSCH have a same payload size. In these aspects, the control information indicates at least a total number of the plurality of DCI messages and the payload size. In some aspects, the payload size is one of a set of preconfigured payload sizes.

In some aspects of the disclosure, a first number of the plurality of DCI messages in the PDSCH have a first payload size and a second number of the plurality of DCI messages in the PDSCH have a second payload size. The first number of the plurality of DCI messages may be configured to appear before the second number of the plurality of DCI messages in the PDSCH. In these aspects, the control information indicates the first number of the plurality of DCI messages and the second number of the plurality of DCI messages. In some aspects, control information further indicates a first code rate offset factor for the first number of the plurality of DCI messages and a second code rate offset factor for the second number of the plurality of DCI messages.

At 904, the UE receives the PDSCH including the plurality of DCI messages.

Finally, at 906, the UE obtains one or more of the plurality of DCI messages in the PDSCH based on the control information.

In some aspects of the disclosure, the plurality of DCI messages in the PDSCH have a same size (e.g., same payload size $K = K_{DCI}$). In these aspects, the UE obtains the one or more of the plurality of DCI messages in the PDSCH by determining a total number of resource elements (REs) allocated for the plurality of DCI messages in the PDSCH. For example, the total number of resource elements (REs)

allocated for the plurality of DCI messages in the PDSCH may be $N_{RE,DCI}$ in equation (4). The UE may then determine a total number of coded bits for the plurality of DCI messages in the PDSCH based on the total number of REs. For example, the total number of coded bits for the plurality of DCI messages in the PDSCH may be M=$N_{RE,DCI}$·$Q_m$. The UE determines a number of coded bits for each of the plurality of DCI messages in the PDSCH. For example, the number of coded bits for each of the plurality of DCI messages in the PDSCH may be E=⌊M/A⌋. The UE may split the total number of coded bits based on the number of coded bits to obtain a plurality of coded blocks (e.g., coded blocks 602, 604). In some scenarios, one or more residual coded bits may remain after splitting the total number of coded bits. In these scenarios, the UE assigns the one or more residual coded bits to a last coded block of the plurality of coded blocks. The UE then separately decodes each of the plurality of coded blocks to determine the plurality of DCI messages 606, 608 in the PDSCH.

In some aspects of the disclosure, the plurality of DCI messages in the PDSCH have a same size (e.g., same payload size K=$K_{DCI}$). In these aspects, the UE obtains the one or more of the plurality of DCI messages in the PDSCH by determining a total number of resource elements (REs) allocated for the plurality of DCI messages in the PDSCH. For example, the total number of resource elements (REs) allocated for the plurality of DCI messages in the PDSCH may be $N_{RE,DCI}$ in equation (4). The UE may then determine a number of REs used for each of the plurality of DCI messages in the PDSCH. For example, the number of REs used for each of the plurality of DCI messages may be ⌊$N_{RE,DCI}$/A⌋. The UE may split the total number of REs based on the number of REs used for each of the plurality of DCI messages to obtain a plurality of coded blocks (e.g., coded blocks 602, 604). In some scenarios, one or more residual REs may remain after splitting the total number of REs. In these scenarios, the UE assigns the one or more residual REs to a last coded block of the plurality of coded blocks. The UE then separately decodes each of the plurality of coded blocks to determine the plurality of DCI messages 606, 608 in the PDSCH.

In some aspects of the disclosure, the plurality of DCI messages in the PDSCH have a same size (e.g., same payload size K=$K_{DCI}$). In these aspects, the UE obtains the one or more of the plurality of DCI messages in the PDSCH by determining a total number of resource elements (REs) allocated for the plurality of DCI messages in the PDSCH. For example, the total number of resource elements (REs) allocated for the plurality of DCI messages in the PDSCH may be $N_{RE,DCI}$ in equation (4). In some aspects of the disclosure, the total number of REs is a multiple of a total number of the plurality of DCI messages. The UE may then determine a total number of coded bits for the plurality of DCI messages in the PDSCH based on the total number of REs. For example, the total number of coded bits for the plurality of DCI messages in the PDSCH may be M=$N_{RE,}$$_{DCI}$·$Q_m$. The UE determines a number of coded bits for each of the plurality of DCI messages in the PDSCH. For example, the number of coded bits for each of the plurality of DCI messages in the PDSCH may be E=⌊M/A⌋. The UE may split the total number of coded bits based on the number of coded bits to obtain a plurality of coded blocks (e.g., coded blocks 702, 704). The UE then separately decodes each of the plurality of coded blocks to determine the plurality of DCI messages 706, 708 in the PDSCH.

In some aspects of the disclosure, at least two of the plurality of DCI messages in the PDSCH have different sizes (e.g., different payload size K). In these aspects, the UE obtains the one or more of the plurality of DCI messages in the PDSCH by determining a total number of resource elements (REs) allocated for the plurality of DCI messages in the PDSCH based on a nominal payload size for each of the plurality of DCI messages in the PDSCH. The UE determines a total number of coded bits for the plurality of DCI messages in the PDSCH based on the total number of REs. The UE determines a number of coded bits for each of the plurality of DCI messages in the PDSCH. The UE splits the total number of coded bits based on the number of coded bits to obtain a plurality of coded blocks. The UE separately decoding each of the plurality of coded blocks to determine the plurality of DCI messages in the PDSCH.

FIG. 10 is a flowchart 1000 of a method of wireless communication. The method may be performed by a UE (e.g., the UE 104, 402; the apparatus 1102/1102'; the processing system 1214, which may include the memory 360 and which may be the entire UE 104, 402 or a component of the UE 104, 402, such as the TX processor 368, the RX processor 356, and/or the controller/processor 359).

At 1002, the UE obtains a first downlink control information (DCI) message transmitted in a physical downlink control channel (PDCCH). The first DCI message includes first control information for a physical downlink shared channel (PDSCH) including a second DCI message.

At 1004, the UE receives the PDSCH including the second DCI message.

Finally, at 1006, the UE obtains the second DCI message in the PDSCH based on the first control information. The second DCI message includes second control information for a next slot of the PDSCH.

Figure 11:
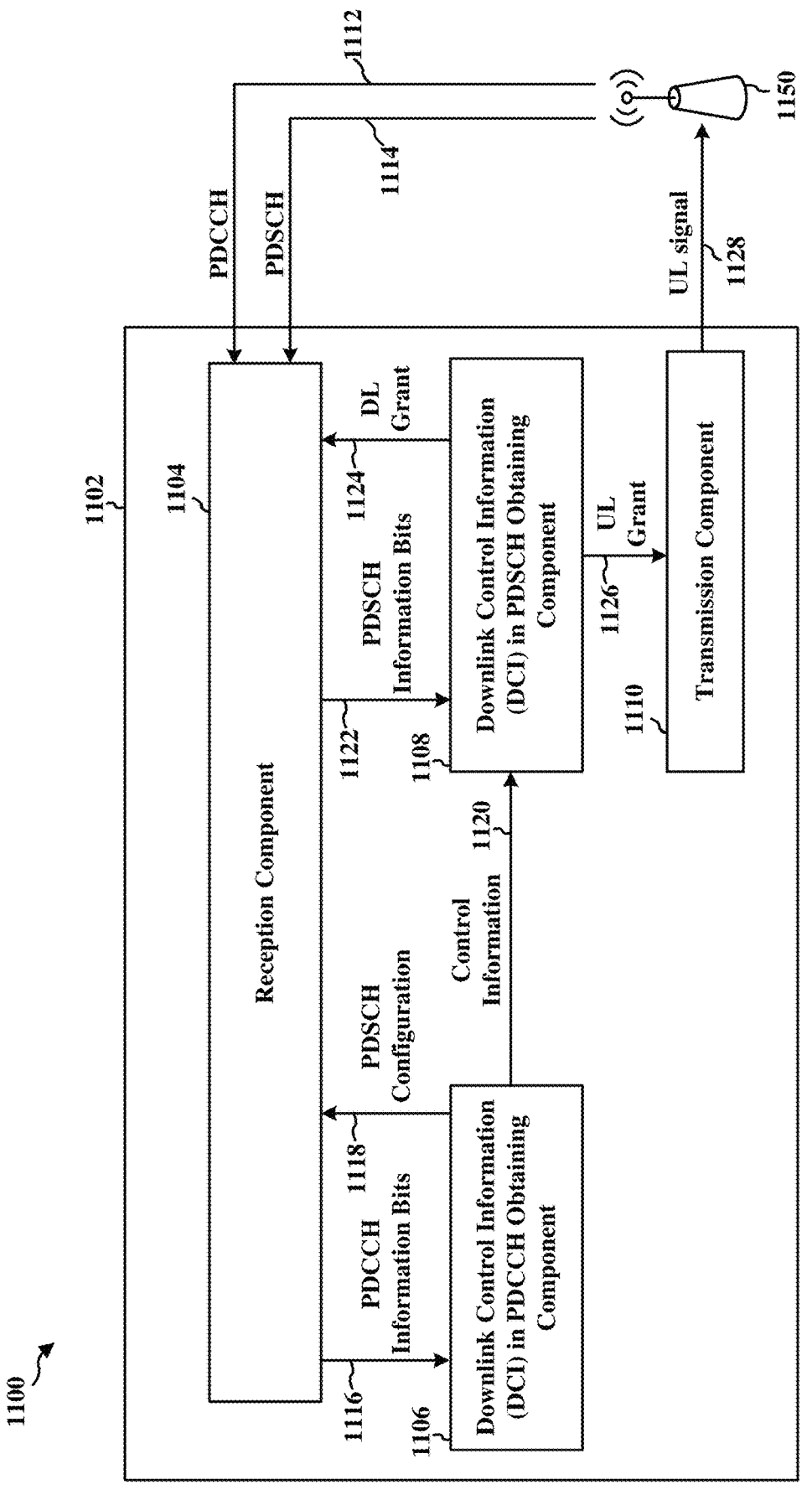
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE. The apparatus includes a reception component 1104 that receives a physical downlink control channel (PDCCH) 1112 and a physical downlink shared channel (PDSCH) 1114 from a base station 1150. The base station 1150 may be a 5G NR base station in some implementations. The PDSCH 1114 may include a number A of DCI messages (e.g., in resources of the PDSCH 1114 referred to as a piggyback region for carrying the A DCI messages).

The apparatus further includes a downlink control information (DCI) in PDCCH obtaining component 1106 that obtains control information 1120 from the PDCCH 1112. The downlink control information (DCI) in PDCCH obtaining component 1106 may provide PDSCH configuration information 1118 to the reception component 1104 to enable receiving of the PDSCH 1114. In some examples, the control information 1120 indicates at least a total number (e.g., A) of the plurality of DCI messages included in the PDSCH 1114 and a code rate offset factor.

The apparatus further includes a downlink control information (DCI) in PDSCH obtaining component 1108 that obtains one or more of the plurality of DCI messages in the PDSCH 1114 based on the control information 1120. In some examples, the DCIs in PDSCH include a DL grant 1124 and/or a UL grant 1126.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
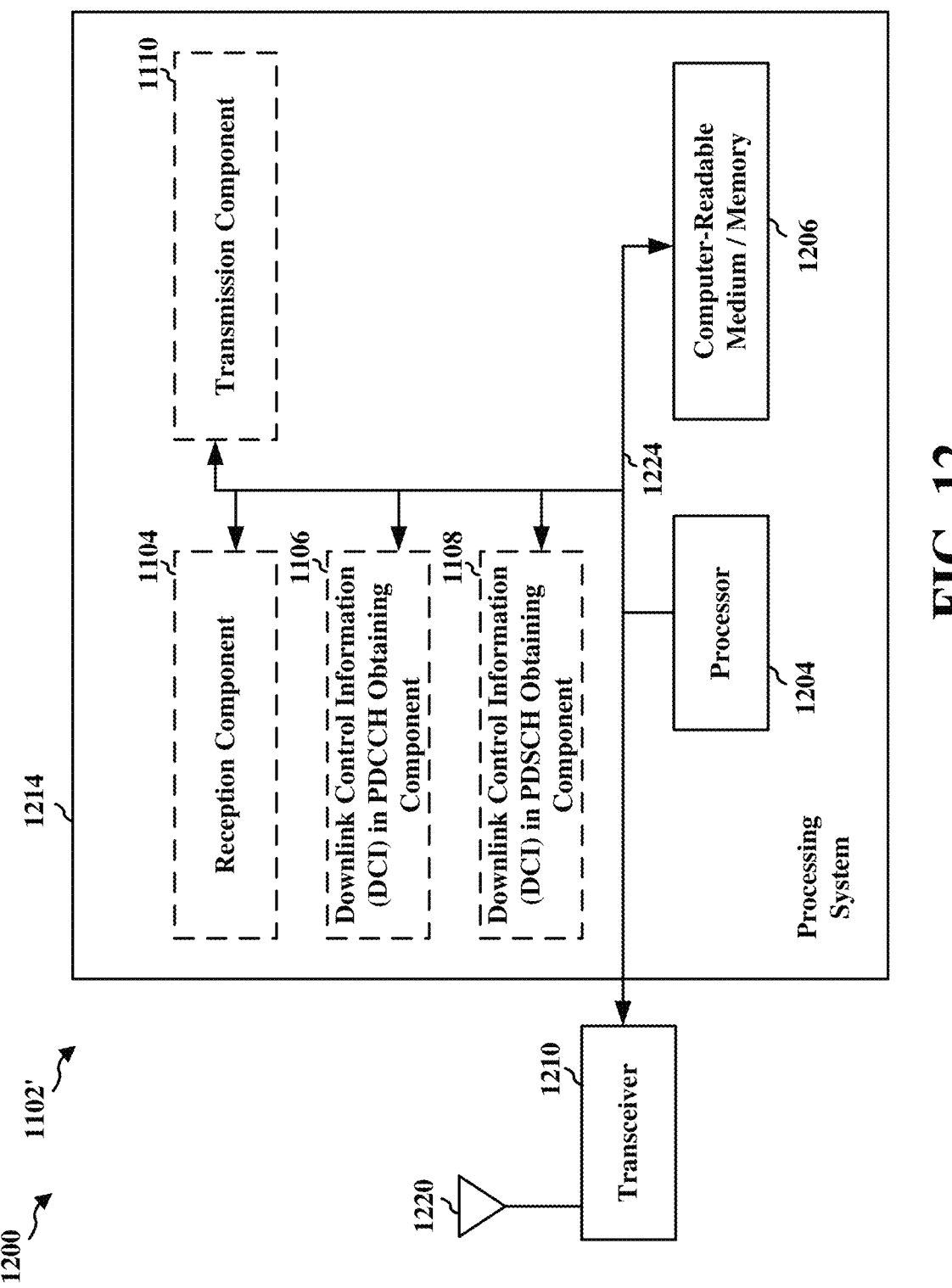
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for obtaining a downlink control information (DCI) message transmitted in a physical downlink control channel (PDCCH), wherein the DCI message includes control information for obtaining a plurality of downlink control information (DCI) messages included in a physical downlink shared channel (PDSCH), means for receiving the PDSCH including the plurality of DCI messages, means for obtaining one or more of the plurality of DCI messages in the PDSCH based on the control information, means for obtaining a first downlink control information (DCI) message transmitted in a physical downlink control channel (PDCCH), wherein the first DCI message includes first control information for a physical downlink shared channel (PDSCH) including a second DCI message, means for receiving the PDSCH including the second DCI message, and means for obtaining the second DCI message in the PDSCH based on the first control information, the second DCI message including second control information for a next slot of the PDSCH.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. As used herein, the term "obtaining" may include one or more actions including, but not limited to, determining, decoding, calculating, or any combination thereof.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:

obtaining, at a user equipment (UE), a downlink control information (DCI) message transmitted in a physical downlink control channel (PDCCH), wherein the DCI message includes control information for obtaining a plurality of downlink control information (DCI) messages included in a physical downlink shared channel (PDSCH), wherein each of the plurality of DCI messages is separately encoded in a single code block, and the control information for obtaining the plurality of DCI indicates a total number of the plurality of DCI messages and a code rate offset factor;

receiving, at the UE, the PDSCH including the plurality of DCI messages; and obtaining one or more of the plurality of DCI messages in the PDSCH based on the control information.

2. The method of claim 1, wherein the plurality of DCI messages in the PDSCH have a same size, and wherein the obtaining the one or more of the plurality of DCI messages in the PDSCH comprises:

determining a total number of resource elements (REs) allocated for the plurality of DCI messages in the PDSCH;

determining a total number of coded bits for the plurality of DCI messages in the PDSCH based on the total number of REs;

determining a number of coded bits for each of the plurality of DCI messages in the PDSCH;

splitting the total number of coded bits based on the number of coded bits to obtain a plurality of coded blocks; and separately decoding each of the plurality of coded blocks to determine the plurality of DCI messages in the PDSCH.

3. The method of claim 2, wherein one or more residual coded bits remain after splitting the total number of coded bits, and wherein the splitting the total number of coded bits comprises:

assigning the one or more residual coded bits to a last coded block of the plurality of coded blocks.

4. The method of claim 1, wherein the plurality of DCI messages in the PDSCH have a same size, and wherein the obtaining the one or more of the plurality of DCI messages in the PDSCH comprises:

determining a total number of resource elements (REs) allocated for the plurality of DCI messages in the PDSCH;

determining a number of REs used for each of the plurality of DCI messages in the PDSCH;

splitting the total number of REs based on the number of REs to obtain a plurality of coded blocks; and separately decoding each of the plurality of coded blocks to determine the plurality of DCI messages in the PDSCH.

5. The method of claim 4, wherein one or more residual REs remain after splitting the total number of REs, and wherein the splitting the total number of REs comprises:

assigning the one or more residual REs to a last coded block of the plurality of coded blocks.

6. Method of claim 1, wherein the plurality of DCI messages in the PDSCH have a same size, and wherein the obtaining the one or more of the plurality of DCI messages in the PDSCH comprises:

determining a total number of resource elements (REs) allocated for the plurality of DCI messages in the PDSCH, wherein the total number of REs is a multiple of a total number of the plurality of DCI messages;

determining a total number of coded bits for the plurality of DCI messages in the PDSCH based on the total number of REs;

determining a number of coded bits for each of the plurality of DCI messages in the PDSCH;

splitting the total number of coded bits based on the number of coded bits to obtain a plurality of coded blocks; and separately decoding each of the plurality of coded blocks to determine the plurality of DCI messages in the PDSCH.

7. The method of claim 1, wherein at least two of the plurality of DCI messages in the PDSCH have different sizes, and wherein the obtaining the one or more of the plurality of DCI messages in the PDSCH comprises:

determining a total number of resource elements (REs) allocated for the plurality of DCI messages in the PDSCH based on a nominal payload size for each of the plurality of DCI messages in the PDSCH;

determining a total number of coded bits for the plurality of DCI messages in the PDSCH based on the total number of REs;

determining a number of coded bits for each of the plurality of DCI messages in the PDSCH;

splitting the total number of coded bits based on the number of coded bits to obtain a plurality of coded blocks; and separately decoding each of the plurality of coded blocks to determine the plurality of DCI messages in the PDSCH.

8. The method of claim 1, wherein each of the plurality of DCI messages in the PDSCH have a same payload size, and wherein the control information for obtaining the plurality of DCI messages included in the PDSCH indicates at least a total number of the plurality of DCI messages and the payload size.

9. The method of claim 8, wherein the payload size is one of a set of preconfigured payload sizes.

10. The method of claim 1, wherein a first number of the plurality of DCI messages in the PDSCH have a first payload size and a second number of the plurality of DCI messages in the PDSCH have a second payload size, wherein the first number of the plurality of DCI messages appear before the second number of the plurality of DCI messages in the PDSCH, wherein the control information indicates the first number and the second number.

11. The method of claim 10, wherein the control information further indicates a first code rate offset factor for the first number of the plurality of DCI messages and a second code rate offset factor for the second number of the plurality of DCI messages.

12. The method of claim 1, wherein the plurality of DCI messages includes at least one DCI message with a DCI format 0_1 and at least one DCI message with a DCI format 1_1, and wherein each of the plurality of DCI messages included in the PDSCH have a same size.

13. The method of claim 1, wherein the plurality of DCI messages includes at least one DCI message with a DCI format 0_2 and at least one DCI message with a DCI format 1_2, and wherein each of the plurality of DCI messages included in the PDSCH have a same size.

14. The method of claim 1, wherein the plurality of DCI messages includes at least one DCI message with a DCI format 0_1 and at least one DCI message with a DCI format 1_1, and wherein the at least one DCI message with a DCI format 0_1 has a first size and the at least one DCI message with a DCI format 1_1 has a second size.

15. The method of claim 1, wherein the plurality of DCI messages includes:
    at least one DCI message with a DCI format 0_1 and at least one DCI message with a DCI format 1_1, and wherein the at least one DCI message with the DCI format 0_1 and the at least one DCI message with the DCI format 1_1 have a first size; and
    at least one DCI message with a DCI format 0_0 and at least one DCI message with a DCI format 1_0, and wherein the at least one DCI message with the DCI format 0_0 and the at least one DCI message with the DCI format 1_0 have a second size.

16. The method of claim 1, wherein the plurality of DCI messages includes:
    at least one DCI message with a DCI format 0_1 and at least one DCI message with a DCI format 1_1, and wherein the at least one DCI message with the DCI format 0_1 and the at least one DCI message with the DCI format 1_1 have a first size;
    at least one DCI message with a DCI format 0_2 and at least one DCI message with a DCI format 1_2, and wherein the at least one DCI message with the DCI format 0_2 and the at least one DCI message with the DCI format 1_2 have a second size; or
    at least one DCI message with a DCI format 0_0 and at least one DCI message with a DCI format 1_0, and wherein the at least one DCI message with the DCI format 0_0 and the at least one DCI message with the DCI format 1_0 have a third size.

17. An apparatus for wireless communication, comprising:
    a memory; and
    at least one processor coupled to the memory and configured to:
        obtain a downlink control information (DCI) message transmitted in a physical downlink control channel (PDCCH), wherein the DCI message includes control information for obtaining a plurality of downlink control information (DCI) messages included in a physical downlink shared channel (PDSCH), wherein each of the plurality of DCI messages is separately encoded in a single code block, and the control information for obtaining the plurality of DCI indicates a total number of the plurality of DCI messages and a code rate offset factor;
        receive the PDSCH including the plurality of DCI messages; and
        obtain one or more of the plurality of DCI messages in the PDSCH based on the control information.

18. The apparatus of claim 17, wherein the plurality of DCI messages in the PDSCH have a same size, and
    wherein to obtain the one or more of the plurality of DCI messages in the PDSCH the memory and at least one processor are configured to:
        determine a total number of resource elements (REs) allocated for the plurality of DCI messages in the PDSCH;
        determine a total number of coded bits for the plurality of DCI messages in the PDSCH based on the total number of REs;
        determine a number of coded bits for each of the plurality of DCI messages in the PDSCH;

split the total number of coded bits based on the number of coded bits to obtain a plurality of coded blocks; and
        separately decode each of the plurality of coded blocks to determine the plurality of DCI messages in the PDSCH.

19. The apparatus of claim 17, wherein the plurality of DCI messages in the PDSCH have a same size, and
    wherein to obtain the one or more of the plurality of DCI messages in the PDSCH the memory and at least one processor are configured to:
        determine a total number of resource elements (REs) allocated for the plurality of DCI messages in the PDSCH;
        determine a number of REs used for each of the plurality of DCI messages in the PDSCH;
        split the total number of REs based on the number of REs to obtain a plurality of coded blocks; and
        separately decode each of the plurality of coded blocks to determine the plurality of DCI messages in the PDSCH.

20. Apparatus of claim 17, wherein the plurality of DCI messages in the PDSCH have a same size, and
    wherein to obtain the one or more of the plurality of DCI messages in the PDSCH the memory and at least one processor are configured to:
        determine a total number of resource elements (REs) allocated for the plurality of DCI messages in the PDSCH, wherein the total number of REs is a multiple of a total number of the plurality of DCI messages;
        determine a total number of coded bits for the plurality of DCI messages in the PDSCH based on the total number of REs;
        determine a number of coded bits for each of the plurality of DCI messages in the PDSCH;
        split the total number of coded bits based on the number of coded bits to obtain a plurality of coded blocks; and
        separately decode each of the plurality of coded blocks to determine the plurality of DCI messages in the PDSCH.

21. The apparatus of claim 17, wherein at least two of the plurality of DCI messages in the PDSCH have different sizes, and
    wherein to obtain the one or more of the plurality of DCI messages in the PDSCH the memory and at least one processor are configured to:
        determine a total number of resource elements (REs) allocated for the plurality of DCI messages in the PDSCH based on a nominal payload size for each of the plurality of DCI messages in the PDSCH;
        determine a total number of coded bits for the plurality of DCI messages in the PDSCH based on the total number of REs;
        determine a number of coded bits for each of the plurality of DCI messages in the PDSCH;
        split the total number of coded bits based on the number of coded bits to obtain a plurality of coded blocks; and
        separately decode each of the plurality of coded blocks to determine the plurality of DCI messages in the PDSCH.

22. The apparatus of claim 17, wherein each of the plurality of DCI messages in the PDSCH have a same payload size, and wherein the control information for obtaining the plurality of DCI messages included in the PDSCH indicates at least a total number of the plurality of DCI messages and the payload size.

23. The apparatus of claim 17, wherein a first number of the plurality of DCI messages in the PDSCH have a first payload size and a second number of the plurality of DCI messages in the PDSCH have a second payload size, wherein the first number of the plurality of DCI messages appear before the second number of the plurality of DCI messages in the PDSCH, wherein the control information indicates the first number and the second number.

24. A computer-readable memory storing computer executable code, the code when executed by a processor cause the processor to:

obtain a downlink control information (DCI) message transmitted in a physical downlink control channel (PDCCH), wherein the DCI message includes control information for obtaining a plurality of downlink control information (DCI) messages included in a physical downlink shared channel (PDSCH), wherein each of the plurality of DCI messages is separately encoded in a single code block, and the control information for obtaining the plurality of DCI indicates a total number of the plurality of DCI messages and a code rate offset factor;

receive the PDSCH including the plurality of DCI messages; and obtain one or more of the plurality of DCI messages in the PDSCH based on the control information.

\* \* \* \* \*